United States Patent [19]
Schwartz

[11] 3,942,924
[45] Mar. 9, 1976

[54] FORMING DEVICE WITH FIRST AND SECOND MATERIAL PROPORTIONING MEANS

[75] Inventor: Paul H. Schwartz, Boulder, Colo.

[73] Assignee: Dura Products, Inc., Boulder, Colo.

[22] Filed: Oct. 18, 1973

[21] Appl. No.: 407,664

[52] U.S. Cl. .............. 425/110; 222/309; 264/310; 425/130; 425/429
[51] Int. Cl.² ........................................ B29C 5/04
[58] Field of Search .......... 425/130, 435, 429, 110; 222/145, 309; 264/310

[56] References Cited
UNITED STATES PATENTS

| | | | |
|---|---|---|---|
| 2,792,614 | 5/1957 | Altschuler | 425/429 |
| 2,946,488 | 7/1960 | Kraft | 222/309 X |
| 3,474,165 | 10/1969 | Rakes et al. | 425/435 X |

*Primary Examiner*—Robert D. Baldwin
*Attorney, Agent, or Firm*—Robert E. Harris

[57] ABSTRACT

A forming device and method is disclosed herein that is particularly useful for forming large parts of polyurethane material. The forming device includes a proportioner that meters relative amounts of materials through separate supply sources to a mixer where the materials are combined and then supplied to a mold, the mold being then rotated to displace the materials throughout the mold to form therefrom a part having a preselected shape. Where the materials to be combined are polyurethane components, the components are combined and quickly supplied to the mold to displace and cure the part while in said mold. The proportioner has a fixed bar and a movable bar centrally pivoted on the fixed bar with metering pistons mounted between the bars at opposite sides of the pivot junction, the movable bar being pivoted by a power actuator that includes power pistons mounted adjacent to the metering pistons and between the movable and fixed bars to pivot the movable bar, pivotal movement in one direction causing materials to be drawn into the cylinders of the metering pistons and pivotal movement in the opposite direction causing material to be ejected from the cylinders of the metering pistons to the mixer in a predetermined precise ratio of materials.

9 Claims, 12 Drawing Figures

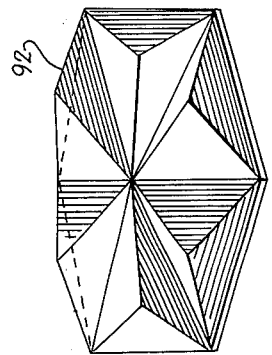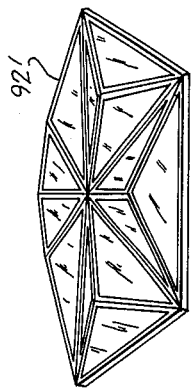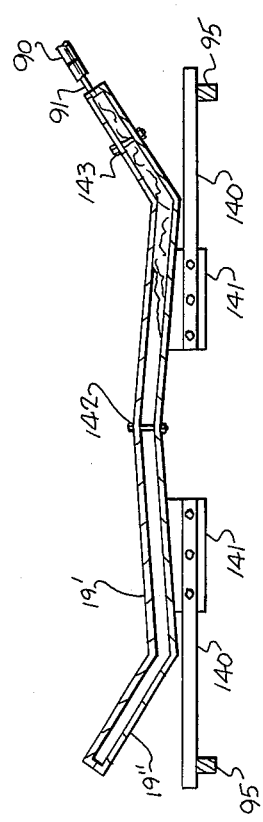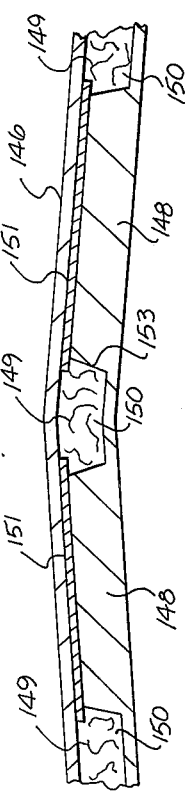

FORMING DEVICE WITH FIRST AND SECOND MATERIAL PROPORTIONING MEANS

FIELD OF THE INVENTION

This invention relates to a forming device, and, more particularly, relates to a device for combining materials and forming therefrom a part of desired shape.

BACKGROUND OF THE INVENTION

It is oftentimes desired that a particular part, or piece, be formed from materials that must be mixed prior to piece formation. This can occur, for example, where two liquid state components are mixed and, after mixing, cured to assume a solid state with the part being formed usually in a mold having the desired contour, the mixture commonly then being retained in the mold until curing has progressed sufficiently such that the formed part has sufficient rigidity to retain the desired shape without mold assistance. Where the components are those necessary to form a polyurethane part, mixing of the components and forming of the part must occur rapidly since curing progresses quite swiftly after the components are mixed.

Since the achieved mixture determines the product and quality thereof, it is, of course, necessary that not only must a system be provided for rapid handling of the mixed materials, the materials must be metered, or proportioned, as accurately as possible each time a piece is formed.

While heretofore known and/or utilized devices have provided systems for mixing materials and forming a piece of desired contour from mixed materials, such devices have not proved to be completely successful in providing a system for rapid handling of materials and/or achieving dependable metering of the desired amounts of materials relative to each other as is necessary to achieve quality of product.

In addition, where mixtures that are difficult to handle are concerned, such as polyurethane, the devices now known and/or utilized have not proved to be capable of handling such materials in an entirely satisfactory manner, particularly where the piece to be formed had unusual characteristics, such as, for example, being relatively large in size and/or having windows to be formed therein. Heretofore known and/or utilized devices have, for example, not been capable of mixing adequate amounts of materials in sufficient time and/or require the use of small orifices and high pressures for metering and delivery of materials.

SUMMARY OF THE INVENTION

This invention provides a device for forming parts, the device being particularly useful for forming panels of polyurethane and is well suited for forming panels of relatively large size that may be joined to form a building structure. The device includes an improved proportioning device for receiving materials to be mixed and metering the same in preselected relative amounts to a mixer where the materials are combined and then directed to a mold where the piece is formed into a retainable desired shape. The proportioning device includes a pair of metering pistons that are simultaneously actuated to assure precise metering of materials, and does not require small orifices or high pressures for metering and delivery of materials. The mold is mounted in a casting device so that the mold is rotated about mutually perpendicular axes to facilitate piece formation. An improved apparatus is also provided for inserting windows in panels during formation of the panels.

It is therefore an object of this invention to provide an improved forming device.

It is another object of this invention to provide an improved forming device for forming pieces of polyurethane material.

It is yet another object of this invention to provide an improved forming device for forming large panels of polyurethane material, said panels being joinable to form a building structure.

It is still another object of this invention to provide an improved forming device having a proportioner for receiving materials and metering the same to a mixer, the mixed material being directed to a mold to form a piece having a retainable desired shape.

It is still another object of this invention to provide an improved forming device having a proportioner for precise metering of materials to assure quality of product.

It is another object of this invention to provide an improved method for forming a desired piece.

It is still another object of this invention to provide an improved method for forming pieces that include metering precise amounts of materials, mixing the metered materials, and inserting the mixed material into a mold where the pieces are caused to assume a desired shape.

It is another object of this invention to provide a proportioner for metering materials in predetermined relative amounts.

It is yet another object of this invention to provide a proportioner having metering pistons.

It is still another object of this invention to provide a proportioner having an actuator for simultaneously actuating metering pistons to meter precise relative amounts of material through the proportioner.

It is another object of this invention to provide an apparatus and method for inserting windows in pieces during formation of the pieces.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiments of the herein disclosed invention are meant to be included as come within the scope of the claims.

BRIEF DESCRIPTION OF THE DRAWINGS

The accompanying drawings illustrate a complete embodiment, along with alternative components thereof, of the invention according to the best modes so far devised for the practical application of the principles thereof, and in which:

FIG. 7 is a cross-sectional view of the mold shown in FIG. 5;

FIG. 8 is a perspective view of a panel formed in accordance with this invention, utilizing the mold shown in FIGS. 5, 6 and 7, the illustrated panel being of hexagonal shape;

FIG. 9 is a cross-sectional view of an alternate embodiment of a portion of a mold showing an adaption for forming windows in the formed piece;

FIG. 10 is a perspective view of a formed piece with windows therein utilizing the mold shown in FIG. 9, the piece being of pentagonal shape;

DESCRIPTION OF THE INVENTION

Figure 1:
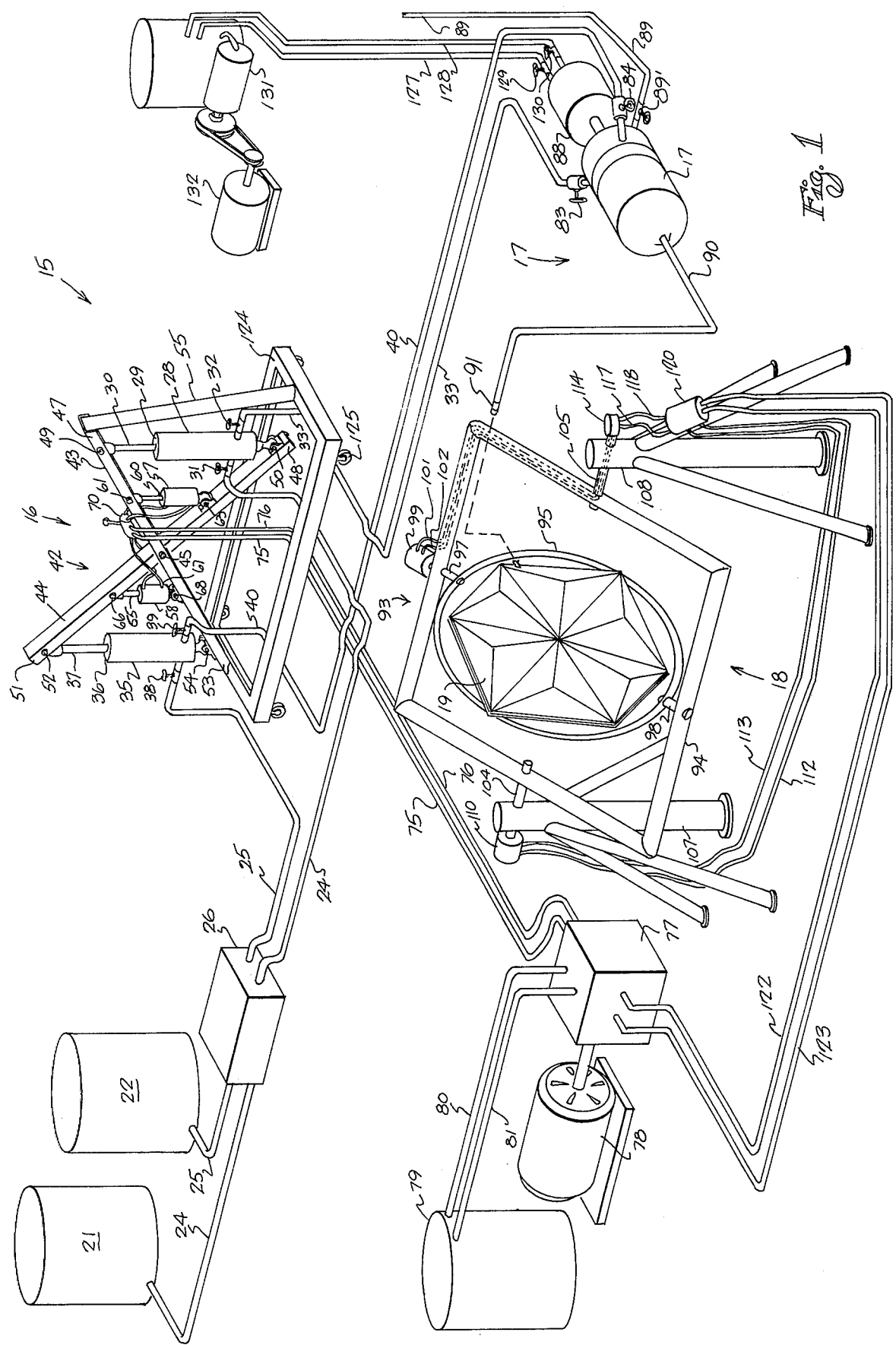
FIG. 1 is a perspective view of the forming device of this invention.
Figure 2:
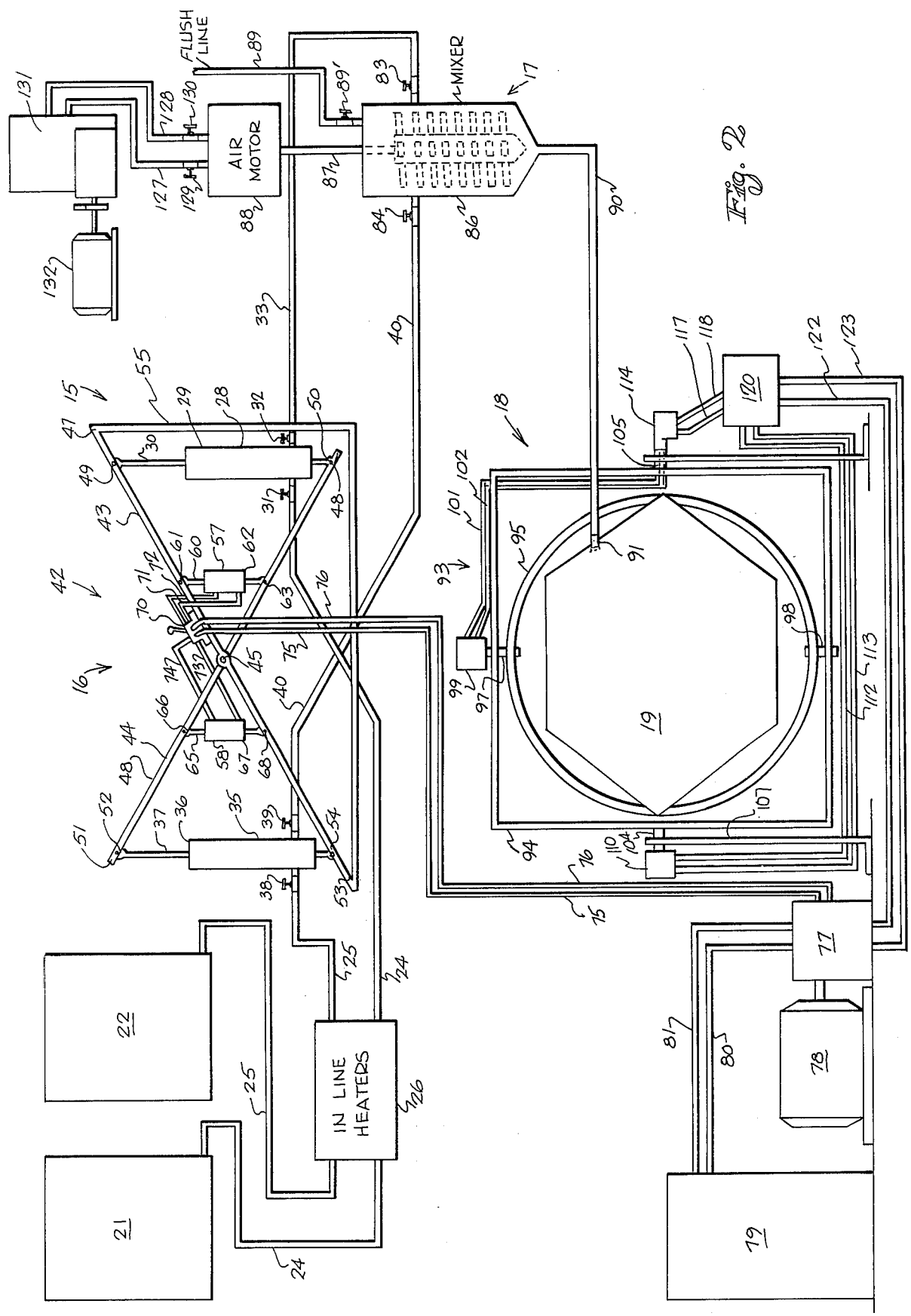
FIG. 2 is a flow schematic of the forming device as shown in FIG. 1.

Referring now to the drawings, the numeral 15 refers generally to the forming device of this invention. As shown in FIGS. 1 and 2, the forming device of this invention includes a proportioner 16, a mixer 17 and a caster 18 supporting mold 19. As can be seen from FIGS. 1 and 2, materials to be mixed are metered through the proportioner 16 to the mixer 17 where the materials are mixed and then directed to mold 19, the mold 19 being rotated by caster 18 to displace the materials throughout the mold in forming the piece.

As shown by the flow diagram of FIG. 2, the materials to be mixed are stored in separate containers. When polyurethane components are utilized, and this invention is particularly well suited for handling polyurethane components and mixing the same to form relatively large panels of polyurethane material, the components are stored in storage barrels, or receptacles, 21 and 22. As is commerically well known, polyurethane components are normally designated by groups of components, that may be stored in liquid from with relatively long storage life. Such components are commonly known as component A and component B and both are stored in liquid form. When mixed these components start to cure very rapidly, for example, on the order of 60 seconds after mixing, and hence must be maintained separated for as long a time as possible. Components A and B may be commercially procured, for example, from Reichold Chemicals, Inc., 525 North Broadway, White Plains, New York and United Foam Corporation, 19201 South Reyes Avenue, Compton, California 90221, Component A from United Foam Corporation being identified as Isocyanate and Component B being identified as Resin/Polyo while Component A from Reichold Chemicals, Inc. is identified as a Urethane containing Polymeric Isocyanates and Component B is identified to be a Urethane Resin containing Tertiary Amines.

The materials stored in receptacles 21 and 22, which may be of varying viscosity, are withdrawn therefrom through conduits 24 and 25 (which may be flexible as may all conduits utilized herein) and supplied to proportioner 16. As indicated in FIG. 2, an in line heater 26 is preferably provided to heat the liquid materials from the storage receptacles and preferably maintain the materials at about 100° F. The liquid material withdrawn from storage receptacle 21 is supplied to the proportioner through conduit 24 and is drawn into cylinder 28 of metering piston 29. As piston shaft 30 is withdrawn from cylinder 28, material is withdrawn from the storage receptable 21 and conduit 24 and enters cylinder 28. To allow the fluid to come into the cylinder, a valve 31 may be provided at conduit 24 and a second value 32 may be provided at the outlet from the cylinder so that the material is introduced into the cylinder but is not expelled therefrom during the piston upstroke. When the piston shaft is displaced downwardly into the cylinder, the material is forced from the cylinder through conduit 33 with the valves 31 and 32 operated to close off conduit 24 and forcing the liquid material from cylinder 28 into the outlet conduit 33. While manual valves 31 and 32 are illustrated herein, other arrangements including check valves or solenoid valves could be utilized as desired.

In like manner, liquid material withdrawn from storage receptacle 22 is conducted through conduit 25 to cylinder 35 of metering piston 36. Piston shaft 37 of metering piston 36 when withdrawn from the cylinder withdraws liquid material from the storage receptacle 22 through conduit 25 into cylinder 35 through valve 38 in conduit 25. When the piston shaft is displaced downwardly, the liquid material is forced from the cylinder through the use of valve 39 into outlet conduit 40. Again, check valves or solenoid valves could be utilized as desired.

The metering pistons 29 and 36 are simultaneously controlled by means of actuation controller 42. This controller includes a fixed support 43 which may be a bar, or preferably an I beam, and a movable support 44 which may be a second bar, and preferably a second I beam. The movable support 44 is pivotally mounted on fixed support 43 at a centrally located pivot junction 45. Thus, the movable support is pivoted in a scissor-like fashion so that opposite free ends of the movable support, or beam, are displaced in opposite rotational directions toward and away from the ends of the fixed support. Metering pistons 29 and 36 are fastened between the free ends of the fixed and movable supports with metering piston 29 being connected between end 47 of fixed support 43 and end 48 of movable support 44. As shown, piston shaft 30 is connected to end 47 of fixed shaft by conventional fastening means 49, while the end of cylinder 28 is connected to the end 48 of movable support 44 by conventional fastening means 50. These connections of the shaft and cylinder to the fixed and movable supports are preferably releasable so that the metering piston may be moved inwardly and outwardly from the pivot junction as desired.

In like manner, metering piston 36 is mounted at the opposite side of the proportioner. As shown, end 51 of movable support 44 is connected to piston shaft 37 by conventional fastening means 52, while cylinder 35 is connected to end 53 of the fixed support by conventional fastening means 54. The connections of metering piston 36 to the fixed and movable shafts are also made releasable fastening means so that the metering piston can be moved inwardly and outwardly with respect to the pivot junction as desired. Fixed support 43 is maintained in a fixed position in conventional manner such as, for example, by frame 55 connecting the ends 47 and 53 of the fixed support to a base, or floor.

Actuation of the movable support relative to the fixed support is achieved by power pistons 57 and 58 also connected between the movable and fixed supports. As shown, the piston shaft 60 of power piston 57 is connected to the fixed support 43 by conventional fastener 61 while cylinder 62 is connected to movable support 44 by conventional fastener 63. In like manner, piston shaft 65 of power piston 58 is connected to movable support 44 by conventional fastener 66 while cylinder 67 is connected to fixed support 43 by conventional fastener 68. The power pistons are actuated by manual actuator 70 having conduits 71 and 72 leading to power piston 57 and 73 and 74 leading to power piston 58. Input conduits 75 and 76 are connected through divider 77 connected to pump 78 for pumping oil, as needed, from a reservoir 79 through conduits 80 and 81. In conventional fashion, as manual actuator 70 opens the line to let oil, under pressure, into the cylinders, the power pistons are actuated depending upon the particular conduit having oil directed therethrough. Opening of the line at one side, of course, drives the piston in one direction while opening of the line in the other direction drives the piston in the opposite direction.

The outlet conduits 33 and 40 from the proportioner are connected to mixer 17. Manual valves 83 and 84 may be connected in the conduits adjacent to the mixer for isolating the mixer from the remainder of the system. The materials are combined, or mixed, in the mixer and mixing is facilitated by an impeller 86 mounted on shaft t87, the shaft being rotated by air driven motor 88 in conventional fashion. Flush line 89 connected with a solvent supply (not shown) is provided for cleaning the mixer and includes a valve 89'. The mixed material is expelled from the mixer through conduit 90 and injected into mold 19. Connection 91, connecting conduit 90 to mold 19 is releasable so that the conduit can be disconnected from the mold after the mixed liquid materials are injected into the mold so that the mold can thereafter be agitated, as by rotation thereof, to spread the mixed material throughout the mold.

Mold 19, of course, has an internal configuration between the mold halves so that the desired shape is assumed by the piece or part as it is formed into a solid state during curing. As shown in FIG. 8, this molded part 92 can be of hexagonal shape and of thin cross-section when the part is to be a part of a building structure. As shown in FIG. 10, the molded part can also be of pentagonal shape and of thin cross-section when the part is to be used as a part of a building structure. As indicated in FIG. 10, the molded parts can, if desired, also have windows inserted therein.

The mold is fastened to frame 93 and the frame includes an outer frame portion 94 and an inner frame portion 95 with the mold being connected to the inner frame portion. Inner frame portion 95 is rotated about shafts 97 and 98 which extend vertically from outer frame portion 94 and thus mount the inner frame portion for rotation about a vertical axis. An oil driven motor 99 rotates the inner frame under oil pressure being conducted to and removed from tthe motor through conduits 101 and 102, which conduits are preferably along or within the legs of the outer frame portion 94.

The outer frame portion 94 is rotated about shafts 104 and 105 which extend horizontally to thus allow rotation of the outer frame portion about a horizontal axis. As shown, shaft 104 is mounted for rotation on frame support 107 which support may be fastened in conventional manner to a base such as the floor of a building. Shaft 105 is mounted for rotation on frame support of a building. Shaft 105 is mounted for rotation on frame support 108 which support likewise may be mounted to a base such as the floor of a building. Shaft 104 is rotated by oil driven motor 110, and motor 110 has conduits 112 and 113 for supplying and removing oil therefrom, with conduits 101 and 102 being connected to swivel joint 114. Conduits 117 and 118 lead from divider 114 to divider 120 which divider divides pressure and oil flow as needed and as predetermined in conventional fashion. Input conduits 122 and 123 extend from divider 120 to divider 77 connected with pump 78.

As can be seen, when oil is pumped to the motors 99 and 110, the mold is caused to rotate about perpendicular axes and thus spread mixed materials therein throughout the entire mold. Where polyurethane is concerned, the mixed components must be spread quickly throughout the mold since the mixed polyurethane components begin to rise and solidify in about 60 seconds from the time of mixing of the components. As the material rises and solidifies, it grows and expands generally from the surface toward the interior of the mold, with rotation about the mutually perpendicular axes causing the finished piece to be a homogeneous product having great surface density.

Figure 3:
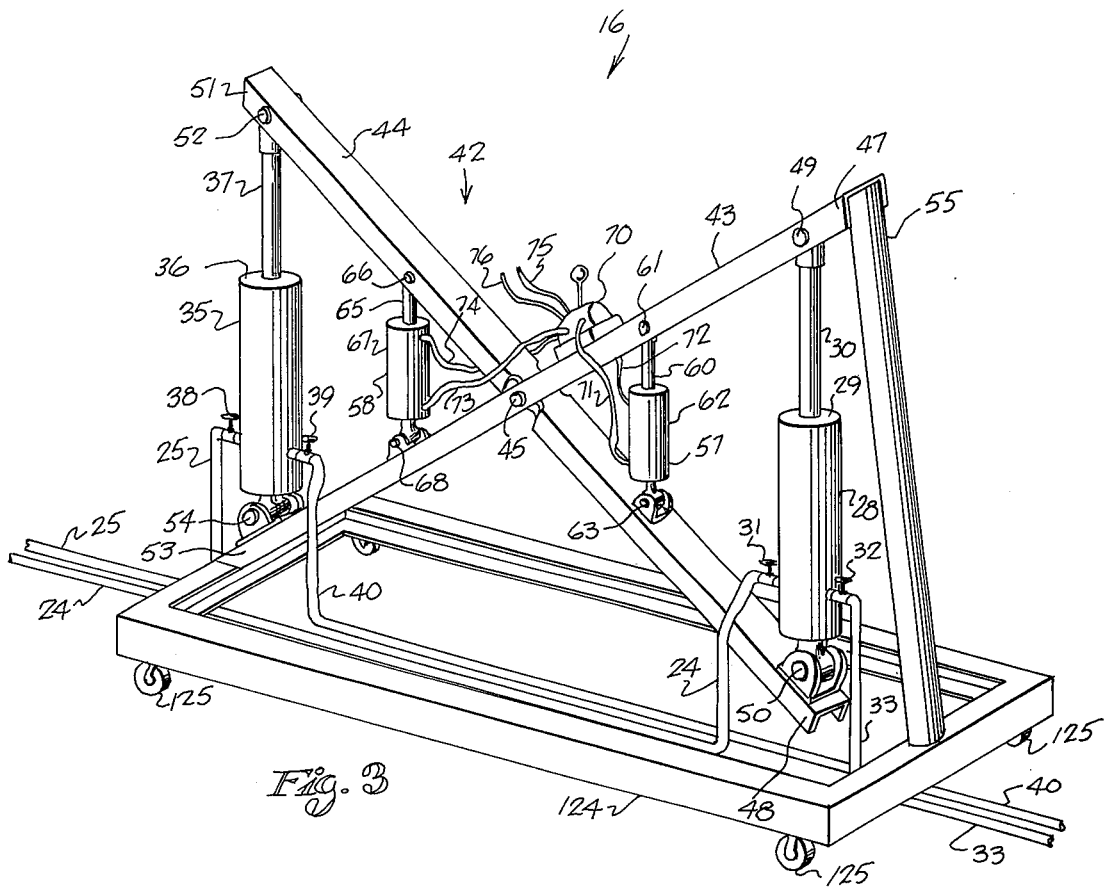
FIG. 3 is a perspective view of the proportioner shown in FIG. 1.

The proportioner of this invention is shown by perspective view in FIG. 3 where the proportioner 16 is shown on a base 124 having wheels 125 thereon so that the proportioner is made readily portable. As shown in FIG. 3 and in the flow schematic of FIG. 2, the relative positioning of the metering pistons 29 and 36 with respect to pivot junction 45 determines the relative amounts of material supplied to the mixer at each stroke of the metering pistons, movement of the ends of the movable and fixed supports toward one another causing material to be expelled from the cylinder of the metering pistons and supplied to the mixer. As the spacing of the metering pistons from the pivot junction is varied, the stroke of the piston shaft likewise varies so that material injected into the cylinder during the upstroke of the pistons and the material expelled from the cylinder during the down-stroke of the piston is precisely controlled. By careful selection of the distance each metering piston is located from the pivot junction, precise control of relative amounts of liquid components directed to the mixer is achieved, and this precise ratio of liquid components thus established will be repeated each time the proportioner is actuated. This is particularly important for pieces to be formed from polyurethane, for example. Where the proportioner is to be utilized to form large parts of polyurethane, the proportioner elements must be large enough to handle the quantities of material. For example, for large parts on the order of 100 square feet and weighing 100 pounds, cylinders of eight inches in diameter and twenty-four inches in length have been utilized for use in metering pistons 29 and 36, while power pistons having cylinders three inches in diameter and 15 inches in length for receiving high pressure of about 3000 P.S.I. have been utilized. To activate the metering pistons, six inch I beams have been used with the proportioner base being 32 inches × 144 inches formed of four inch channel bars mounted on six inch casters. It has also been found that liquid materials may be supplied to the cylinder under a pressure of about 500 P.S.I. While two metering pistons and two power pistons have been shown herein, additional pistons could be utilized as needed or desired.

Figure 4:
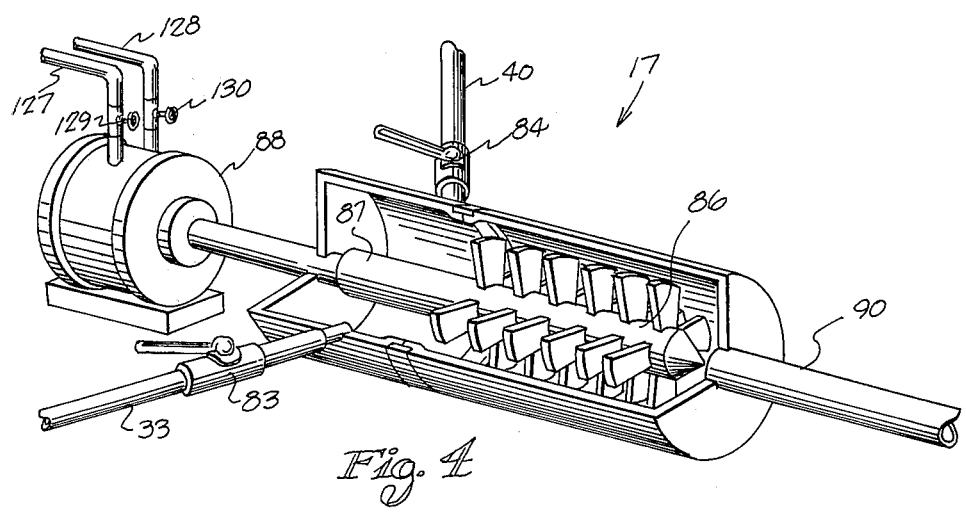
FIG. 4 is a perspective partially cut away view of the mixer shown in FIG. 1.

A perspective view of mixer 17 is shown in FIG. 4, the perspective view being cut-away to better show the impeller 86 therein. It has been fund that this impeller promotes material mixing as the liquid materials are forced from the cylinders of the metering pistons through the mixer. As shown in FIGS. 1, 2 and 4, a motor 88 has a pair of conduits 127 and 128 with valves 129 and 130 therein, conduits 127 and 128 leading to compressor 131 driven by motor 132. If desired, motor 88 could be an electric motor driving impeller 86.

Figure 5:
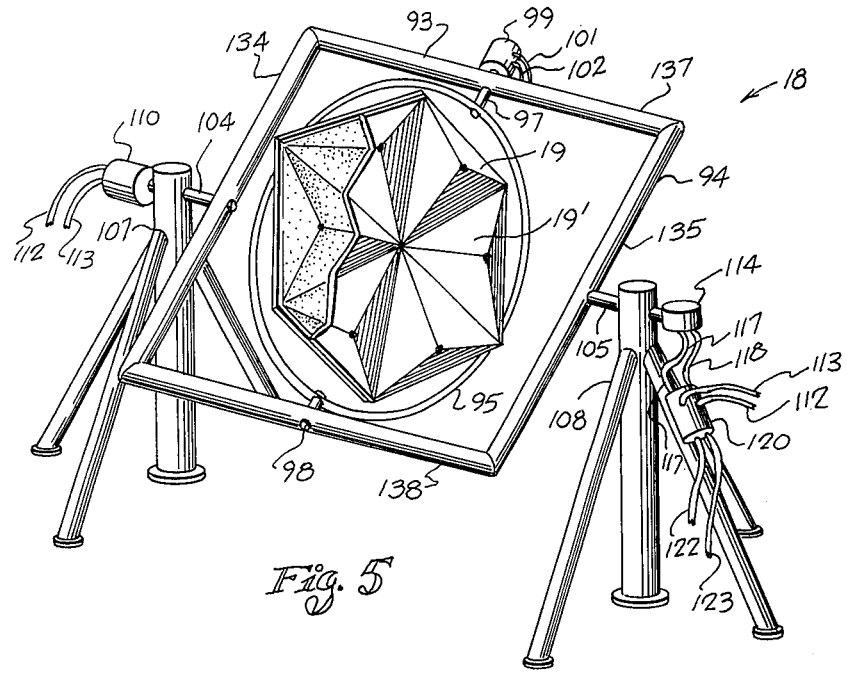
FIG. 5 is a perspective view showing the caster as shown in FIG. 1 with a mold positioned thereon, the mold being partially cut away.

A perspective view of the preferred caster with a mold mounted thereon is shown in FIG. 5. As shown, the supports 107 and 108 receive horizontal shafts 104 and 105 upon which vertical side legs 134 and 135 of the outer frame are pivoted and the inner frame is entirely contained within the outer frame and rotated about the vertical shafts 97 and 98 which extend from the center portion of the upper and lower horizontal legs 137 and 138 of the outer frame. Where large parts of polyurethane are to be formed within mold 19, an inner frame 95 (a ring as shown) has been utilized having a diameter of about 120 inches formed of four inch channel, while an outer frame 94 has been utilized with legs of three inch pipe about 136 inches long. A drive is provided to rotate the inner frame at a speed of from about 0 to 12 revolutions per minute while the outer frame is rotated at a speed of from about 0 to 24 revolutions per minute with a speed of about 5 rpm for the inner frame and 10 rpm for the outer frame being found to be preferable.

Figure 6:
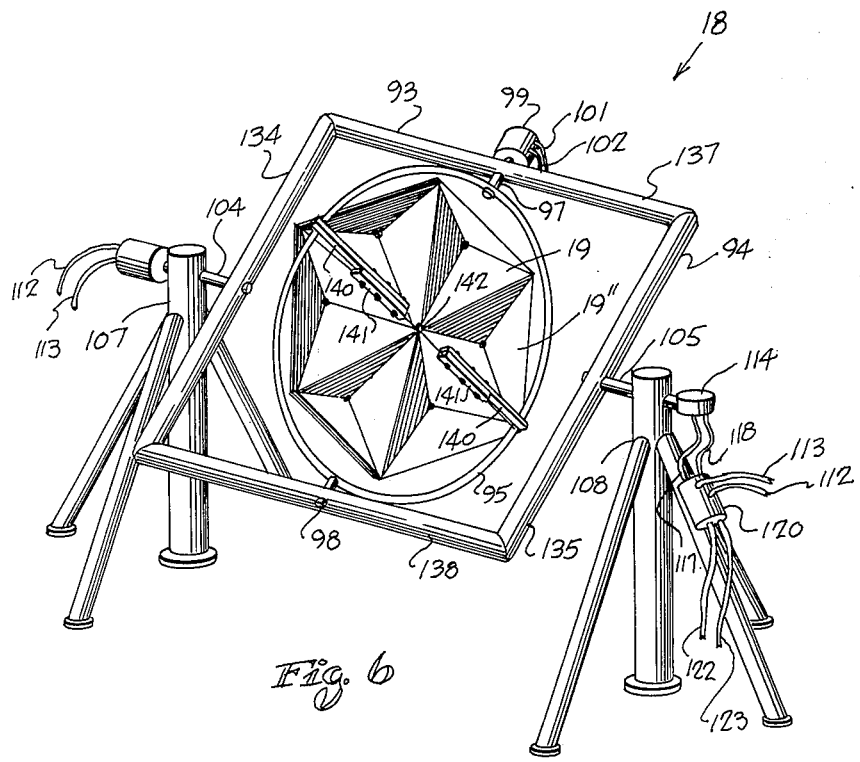
FIG. 6 is a perspective view similar to that of FIG. 5 except showing the rear portion of the mold.

FIG. 6 is similar to FIG. 5 except showing the rear portion of the mold 19" to illustrate mounting of the mold to the inner frame. As shown, a plurality of arms 140 are fastened to and extend from protrusion 141 the rear half of the mold 19" to the inner frame 95 where they are fastened thereto in conventional fashion. As also shown in FIG. 6, a bolt 142 extends through the middle of the mold to better hold the mold halves in place, and a plurality of additional bolts 143 can be likewise utilized if desired or needed.

A cross-sectional view of the mold shown in place and and receiving mixed material from mixer 17 is shown in FIG. 7. As shown, this mold 19 has a hexagonal inner contour to form a molded piece 92 of hexagonal shape as shown in the perspective view in FIG. 8.

FIG. 9 shows a cross-sectional view of an illustration of an alternate mold 146 that may be utilized where parts for building structures are formed using the system and method of this invention. The mold shown in FIG. 9 has a pentagonal inner contour and, in addition, has an adaption therein for forming windows in the molded piece as the piece is formed. As shown, the mold adaption includes a plurality of plugs, or protrusions, 148, to prevent liquid material 149 in cavity 150 from reaching the portion of the mold where a window is desired. The window 151 is placed against the protrusion 148 and extends slightly outwardly therefrom so that as the liquid material comes into the mold the liquid material will contact the outer edges of the window and be retained therein as the liquid material solidifies and cures to thus form a part having a window therein. If desired, the plug may have edge sections 153 that are angled outwardly toward the window to form a slightly extending sill in the formed piece with respect to the inserted window.

Figure 11:
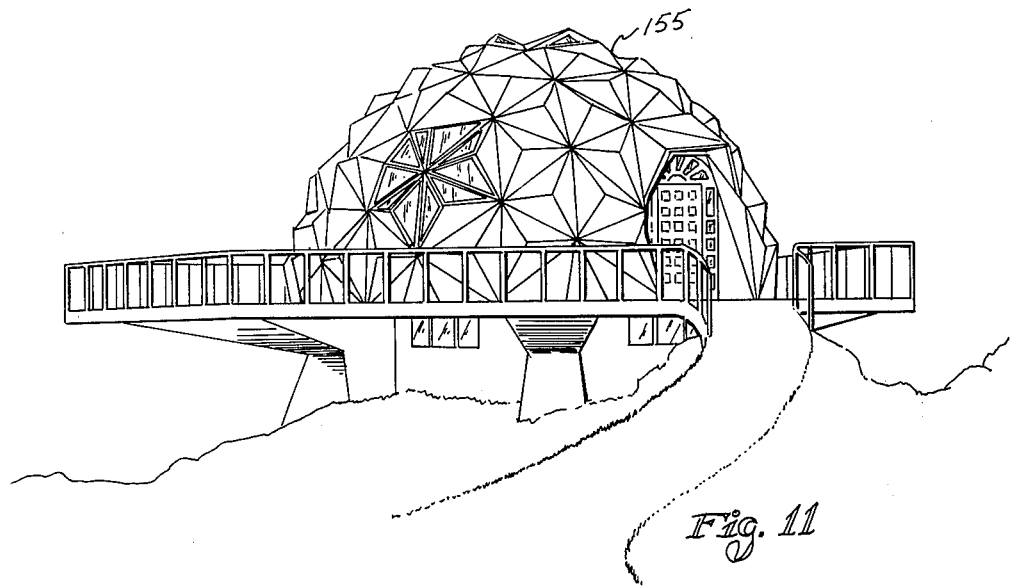
FIG. 11 is a perspective view of a building that can be constructed by joining together pieces as illustrated in FIGS. 8 and 10.

The molded pieces or parts shown in FIG. 8 and 10 are illustrative only, of course, and other pieces may be formed as desired utilizing system and method of this invention. When utilized to form pieces of polyurethane material, as indicated in FIGS. 8 and 10, the finished polyurethane pieces may then be connected in conventional fashion, as by use of a commercial adhesive or bolted together if desired, to form a building structure 155 such as shown for illustrative purposes in FIG. 11. Such a building structure when formed of polyurethane, has been found to have good insulating properties and be quite well suited for use as commercial and/or domestic buildings.

Figure 12:
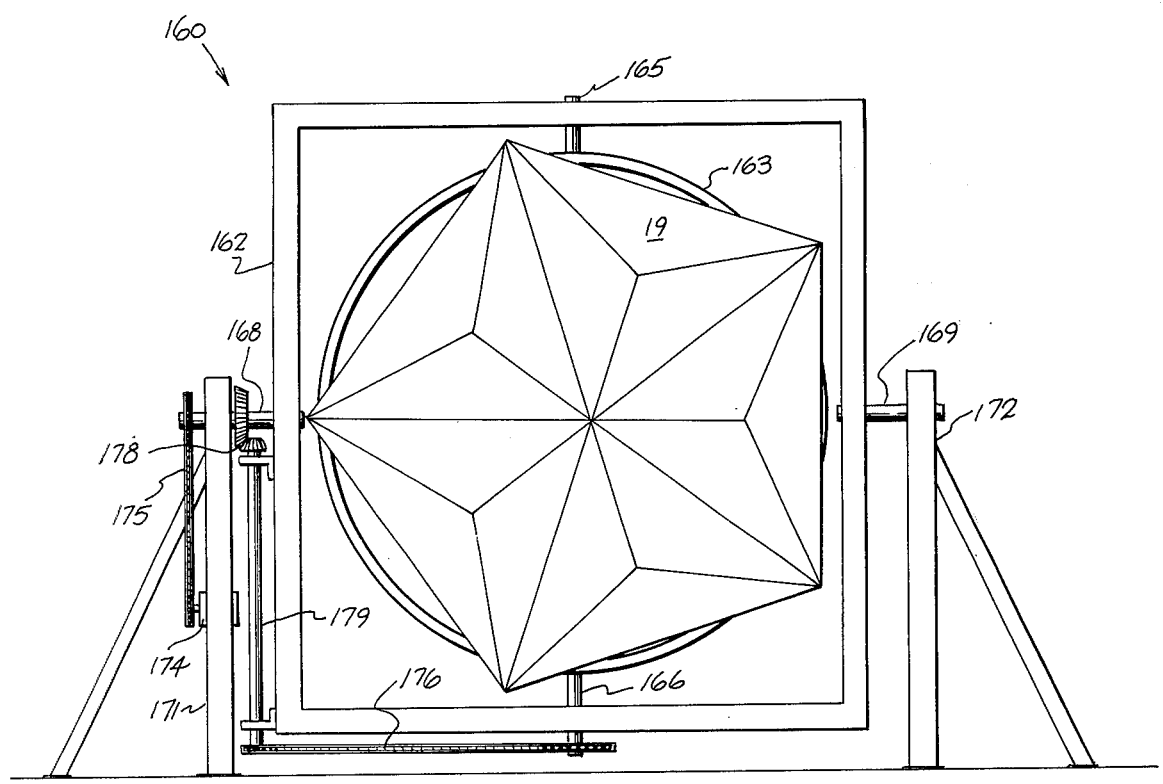
FIG. 12 is a front view illustrating an alternate embodiment of a caster that can be utilized as an element of this invention.

FIG. 12 shows an alternate embodiment of a caster 160 which may be utilized, FIG. 12 being a front view similar to that shown in the flow schematic diagram of FIG. 2. As shown, this embodiment of the caster has an outer frame portion 162 and an inner frame portion 163, the inner frame portion 163 being rotated about vertical shafts 165 and 166 while outer frame portion 162 is rotated about horizontal shafts 168 and 169 in the same manner as described hereinabove with respect to motor 18. Mold 19 is likewise connected to the caster in the same manner as connected to caster 18 and shafts 168 and 169 are similarly mounted to supports 171 and 172. Caster 160 utilizes an electric motor 174 rather than oil driven motors and has a chain and sprocket drive 175 to rotate shaft 168 and a second chain and sprocket drive 176 to drive vertical shaft 166, the latter drive being through bevel gear arrangement 178 and rotating shaft 179 extending between shaft 168 and chain and sprocket drive 176. This system causes rotation of the mold 19 about mutually perpendicular axes as described hereinabove with respect to the caster shown in FIGS. 2 and 5.

In operation, the device of this invention automatically provides a precise ratio of materials to be mixed, rapid mixing of the same, and quick insertion of the mixed materials into a mold for forming a desired piece, or part. As the proportioner is actuated, materials are first drawn in predetermined quantities from each storage receptacle and then forced from the proportioner in exact predetermined relative amounts through the mixer and directed into the mold. The conduit to the mold from the mixer is removed from the mold after insertion of the mixed materials, after which the mold is plugged and then rotated about mutually perpendicular axes to spread the components throughout the mold as the liquid components cure and solidify to form the desired part. Where polyurethane is utilized, curing commences about one minute after mixing, and then as the mold rotates, the polyurethane quickly rises, forms, and solidifies to form the desired product.

As the polyurethane cures, a force of about 1000 P.S.I. is thought to be exerted within the mold by the expanding foam at about 300° F, and 100 pound parts are handled by the device of this invention even though the polyurethane cures very quickly.

As can be seen from the foregoing, this invention provides an improved forming device that is particularly useful for forming pieces of polyurethane material, and further provides a proportioner that is well suited for delivering predetermined precise ratios of materials to be mixed.

What is claimed is:

1. A forming device for forming parts of relatively large dimensions, said device comprising:
   first and second material supplying means for supplying material to be combined;

mixing means for combining material from said first and second material supplying means;

proportioning means including first and second metering means each of which includes a metering piston and each of which receives material from a different one of said first and second material supplying means;

actuating means including a fixed bar and a movable bar mounted for pivoting relative to said fixed bar, said metering pistons being connected between said bars so as to be actuated by pivotal movement therebetween, and said actuating means also including power piston means independent of said metering pistons and being connected between said bars for causing said pivotal movement therebetween; and casting means for receiving material from said mixing means and causing said received material to assume a retainable predetermined shape.

2. The forming device of claim 1 wherein said casting means includes a mold and an agitator for displacing material throughout said mold.

3. The forming device of claim 2 wherein said agitator includes means to rotate said mold about mutually perpendicular axes.

4. A device for forming relatively large pieces of polyurethane, said device comprising:

first and second supply means for supplying polyurethane components in liquid form;

a mixer for combining said polyurethane components at said mixer;

first and second metering pistons for receiving said polyurethane components from said first and second supply means, respectively, and supplying the same to said mixer;

actuating means including a fixed bar and a moveable bar mounted for pivoting relative to said fixed bar, said bars being connected with said metering pistons so as to be actuated by pivotal movement therebetween for causing metering of said polyurethane components from said first and second supply means to said mixer through said metering pistons in predetermined relative amounts, said actuating means also including power piston means independent of said metering piston connected between said bars for causing said pivotal movement therebetween;

a mold for receiving mixed polyurethane components from said mixer;

and mold agitating means for displacing mixed polyurethane components in said mold whereby said mixed polyurethane components are quickly spread throughout said mold to at least partially cure therein to thus form said polyurethane piece.

5. The forming device of claim 4 wherein said actuator includes linking means for preselecting relative amounts of each component to be metered through said first and second metering pistons whereby each actuation of said pistons meters through the precise ratio of said components as preselected, said metering pistons being adjustably connected with said linking means to that said ratio of preselected components to be metered to said mixer can be adjusted as desired.

6. The forming device of claim 4 wherein said mold includes plug means within said mold whereby windows are cast in said piece when said piece is formed.

7. A device for forming relatively large pieces of polyurethane, said device comprising:

first and second storage sources for storing first and second components of a polyurethane mixture in liquid form;

first and second supply conduits connected with said first and second storage means, respectively, to separately withdraw said liquid components from said storage sources;

first and second metering pistons having actuating shafts and cylinder portions for receiving liquid components from said first and second supply conduits, respectively;

a fixed piston support;

a movable piston support mounted for pivotal movement with respect to said fixed support;

means for connecting said metering pistons to said support so that liquid components flow into said cylinders when said actuating shaft is moved in one direction and ejected from said cylinder when said actuating shaft is moved in the opposite direction;

actuating means including power pistons connected with said movable piston support to cause actuation of said piston shaft in said opposite directions;

a mixer;

third and fourth conduits connecting said metering pistons with said mixer;

a mold;

a fifth conduit connected with said mixer to conduct mixed components therefrom, said fifth conduit being connectable with said mold to supply mixed liquid components thereto; and a mold caster for rotating said mold about mutually perpendicular axes to displace mixed liquid components received within said mold throughout the mold for curing within the mold to a desired piece having a preselected shape.

8. The forming device of claim 7 wherein said device includes heating means connected with said first and second supply conduits to heat the components delivered to said metering pistons.

9. The forming device of claim 7 wherein said movable piston support is centrally mounted at a pivot junction for pivotal movement with respect to said fixed piston support, and wherein said metering pistons are connected to said movable support at opposite sides of said pivot junction.

* * * * *